United States Patent Office 3,692,567
Patented Sept. 19, 1972

---

3,692,567
METHOD FOR CONTROLLING NOXIOUS VAPORS
Calvin Vogel, Easton, Pa., assignor to
GAF Corporation, New York, N.Y.
No Drawing. Filed June 1, 1971, Ser. No. 148,952
Int. Cl. B44d *1/44;* C09k *3/28*
U.S. Cl. 117—62
7 Claims

ABSTRACT OF THE DISCLOSURE

Method for substantially removing noxious vapors liberated from materials treated with highly halogenated flame retarding agents upon exposure to heat is provided comprising applying to said materials an organophosphorus compound having the structural formula:

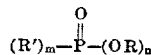

wherein R is a member selected from the group consisting of alkynyl, alkenyl and aralkenyl radicals, R' is a member selected from the group consisting of alkyl, haloalkyl and alkenyl radicals, $m$ is a whole number from 0 to 1 inclusive, and $n$ is a whole number from 2 to 3 inclusive, such that $m+n$ equals 3.

---

This invention relates to the use of organophosphorus compounds as getters for noxious vapors. More particularly, this invention relates to methods for substantially removing noxious vapors liberated from materials treated with highly halogenated flame retarding agents upon exposure to heat.

Natural and synthetic fibers as well as the fabrics made therefrom are generally treated with highly halogenated flame retardants to reduce combustion hazards which may arise through use of such fabric or fibrous materials in heated areas or in areas containing exposed flames. Upon the application of heat to fibrous materials containing such highly halogenated flame retardants, noxious vapors are liberated which are lacrymal and mucous membrane irritants causing discharges from the nose and eyes and severe discomfort to those exposed to such vapors. Moreover, such vapors are sufficiently toxic to cause poisoning of those exposed thereto. The combination of such effects, for example in the midst of a fire, is sufficient to cause severe confusion and panic. Because of the extremely irritating and toxic effects of such vapors, it is often necessary for those who may be exposed thereto to wear special equipment such as gas masks and other air purifying systems. It is desirable therefor to provide a means of treating fibrous materials which contain such highly halogenated flame retardants in order to substantially eliminate the effects of the noxious vapors liberated upon heating such material.

Accordingly, it is an object of the present invention to provide getters which interact with and thereby remove the noxious vapors liberated upon heating fibrous materials treated with highly halogenated flame retardants.

It is another object of the present invention to provide getters for noxious vapors liberated upon heating fibrous materials treated with highly halogenated flame retardants which do not detract from the flame retardancy imparted to said materials by said flame retardants.

It is still another object of the present invention to improve the hand or feel of fibrous materials treated with highly halogenated flame retardants.

These as well as other objects are accomplished by the present invention which provides a method for substantially removing noxious vapors liberated from materials treated with halogenated flame retarding agents upon exposure to heat comprising applying to said material an organophosphorus compound having the structural formula:

wherein R is a member selected from the group consisting of alkynyl, alkenyl and aralkenyl radicals, R' is a member selected from the group consisting of alkyl, haloalkyl and alkenyl radicals, $m$ is a whole number from 0 to 1, inclusive, and $n$ is a whole number from 2 to 3, inclusive, such that $m+n$ equals 3.

Compounds useful as getters in accordance with the present invention include the organophosphates and organophosphonates.

Typical organophosphate getters are those, for example, which can be represented by the structural formula:

wherein R is a member selected from the group consisting of alkynyl, alkenyl and aralkenyl radicals. Illustrative organophosphates are, for example, tripropargyl phosphate, trimethylbutynyl phosphate, trimethylpentynyl phosphate, tri(dimethylhexynyl) phosphate, tributynyl phosphate, triallyl phosphate, trimethallyl phosphate, tricinnamyl phosphate, tri(phenyloleyl) phosphate and the like.

Typical organophosphonates which can be employed in the present invention are those represented by the structural formula:

wherein R' is a member selected from the group consisting of alkyl, haloalkyl and alkenyl and R is as defined above with respect to the organophosphates. Typical organophosphonates are, for example, dipropargyl β-chlorethyl phosphonate, dicinnamyl β-bromoethyl phosphonate, diallyl vinyl phosphonate and the like.

The getters of the present invention can be applied to fibrous materials in any suitable inert vehicle. Generally these organophosphorus compounds form solutions with tetrahydrofuran, halogenated hydrocarbons such as carbon tetrachloride, chloroform, methylene chloride, trichloroethylene and the like. It is considered preferable that the getter be present in the solution to be applied to the fibrous materials in concentrations ranging from about 5 to about 15 percent by weight. The getters can be applied to the fibrous materials in any suitable manner such as, for example, spraying, dipping, padding, immersing or blending with synthetic materials and co-extruding the resultant blend to form the fibrous materials containing the getter therein. The getters are preferably applied to the fibrous materials in sufficient quantities to insure the pick-up thereof of from about 10 to about 90 percent by weight based on the weight of flame retardant in the fibrous material being treated. Preferably, from about 20 to about 50 percent by weight of the getter based upon the weight of flame retardance is picked up by the fibrous material.

Any natural or synthetic fiber or fabric made therefrom can be employed in accordance with the present invention. For example, fibers such as cotton, wool, silk, nylon, rayon, polyesters and the like can be beneficially treated in accordance with the present invention. Generally, these fibers or the fabrics made therefrom are made flame resistant by applying thereto highly halogenated organophosphorus compounds. Typical flame retardant compounds are for example, highly halogenated organophosphates and phosphonates. Typical of such organophosphates are, for example, the tri(2,3-dihaloallyl) phosphates such as tri(2,3-dibromoallyl) phosphate, tri(2,3-dichloroallyl) phosphate and the like; di(2,3-dihalopropyl)allyl phosphates such as di(2,3-dibromopropyl)allyl phosphate; diallyl (2,3-dihalopropyl) phosphates such as diallyl (2,3-dichloropropyl) phosphate; tri(2,3-dichalopropyl) phosphates such as tri(2,3-dibromopropyl) phosphate; tri(2,2,3,3-tetrahalopropyl) phosphates such as tri(2,2,3,3-tetrabromopropyl) phosphate, tri(2,2,3,3-tetrachloropropyl) phosphate and the like; and the di(2,2,3,3-tetrahalopropyl) haloalkyl and alkenyl phosphates such as di(2,2,3,3-tetrabromopropyl)allyl phosphate, di(2,2,3,3-tetrachloropropyl) β-chloroethyl phosphate and the like, as well as the corresponding phosphonates. These highly halogenated organophosphorus compounds impart flame retardation to fibers and fibrous materials to which they are applied. Generally, these organophosphorus compounds are applied to fibrous materials in any suitable inert vehicle. These compounds are usually soluble in halogenated hydrocarbons such as carbon tetrachloride, chloroform, trichloroethylene, perchloroethylene and the like. Solutions or dispersions containing the flame retardant compositions in concentrations ranging from about 5 to about 20% by weight are generally employed.

The flame retardant compositions can be also applied to fibrous materials by any convenient means such as spraying, dipping, immersing, padding and the like. Generally, these flame retardants are applied to the fibrous materials in sufficient quantities to impart to said fibrous materials from about 5 to about 20% by weight on a dry basis of the flame retardant composition.

Although not wishing to be bound by any theory or mechanism, it is currently believed that the noxious vapors liberated upon heating fibrous materials containing flame retardants are primarily attributable to the high halogen concentrations thereof. It is believed that the organic moieties contained in the getters of the present invention react with the halogens thereby substantially removing said halogens from the vapors liberated and thus substantially eliminating the potential harm and discomfort caused by the presence of such noxious vapors. Also it has been found that the organo phosphorus getters of the present invention do not detract from the flame retardancy imparted to the fibrous materials by the flame retardant compositions.

The following examples further define, describe and compare methods of preparing and employing the organophosphorus getter compositions of the present invention. Parts and percentages are by weight unless otherwise indicated.

EXAMPLE 1

The following solutions were respectively prepared and charged to aerosol bottles.

|  | Getter, $OP(OCH_2C \equiv CH)_3$, wt. in grams | Flame retardant, $OP(OCH_2CBr_2CBr_2H)_3$, wt. in grams | Solvent tetrahydrofuran, grams |
|---|---|---|---|
| Solution 1 |  | 5.0 | 45.0 |
| Solution 2 | 0.5 | 5.0 | 44.5 |
| Solution 3 | 5.0 | 5.0 | 40.0 |
| Solution 4 | 5.0 |  | 45.0 |

The propellant in all four solutions was a mixture of 32.5 g. Freon II and 17.5 g. Freon 12.

Strips of cotton broadcloth, 2" x 10", were sprayed with the above soluitons to a 17% dry weight pick-up. The resulting cloth strips were held in the open flame of a burner for a sufficient period of time to cause burning or charring and were then removed. The results obtained are summarized in Table I below:

TABLE I

Solution 1—Cloth charred; vapors very noxious; hand stiff; no afterglow.

Solution 2—Cloth charred; vapors less noxious than from 1; hand stiff; no afterglow.

Solution 3—Cloth charred; vapors substantially inoffensive; soft hand; on afterglow.

Solution 4—Burned entire length, considerable char; no afterglow.

It can be seen from the results obtained that the noxious vapors liberated in the absence of the getter compositions of the present invention are substantially eliminated when the getter composition was present in substantially equal amounts with the flame retardant composition. Moreover, the hand or feel of the resultant fabric was surprisingly substantially softer. It also can be seen that the presence of the getter composition had no adverse effect on the flame retardancy imparted to the fibrous material by the flame retardant.

EXAMPLE 2

Employing the procedure described in Example 1, a solution was prepared consisting of 5 grams of dipropargyl 2-chloroethylphosphonate and 5 grams of $$OP(OCH_2CBr_2CBr_2H)_3$$

flame retardant in 45 grams of tetrahydrofuran.

The resulting solution was sprayed onto a strip of cotton broadcloth to a 17% dry weight pick-up. When held in an open flame, the cloth only charred. The vapors emanating from the heated cloth were only mildly noxious but were entirely tolerable. The hand of the treated cloth was soft. Once the flame was removed, no afterglow was noted.

Although specific materials and conditions were set forth in the above exemplary processes for making and using the organophosphorus getter compositions of this invention, these are merely intended as illustrations of the present invention. Various other organophosphorus getters, vehicles, modes of application, fibers and fabrics such as those listed hereinabove may be substituted in the examples with similar results.

Other modifications of the present invention will occur to those skilled in the art upon a reading of the present disclosure. These are intended to be included within the scope of this invention.

What is claimed is:

1. Method for substantially removing noxious vapors liberated from materials treated with highly halogenated flame retarding agents upon exopsure to heat comprising applying to said materials an organophosphorus compound having the structural formula:

$$(R')_m-\overset{O}{\underset{\|}{P}}-(OR)_n$$

wherein R is a member selected from the group consisting of alkynyl, alkenyl and aralkenyl radicals, R' is a member selected from the group consisting of alkyl, haloalkyl and alkenyl radicals, $m$ is a whole number from 0 to 1 inclusive, and $n$ is a whole number from 2 to 3 inclusive, such that $m+n$ equals 3, in sufficient quantities to impart thereto from about 10 to about 90% by weight of said compound based on the weight of flame retarding agent therein.

2. Method as defined in claim 1 wherein the organophosphorus compound is applied in combination with an inert vehicle.

3. Method as defined in claim 2 wherein the organophosphorus compound is present in the inert vehicle in concentrations ranging from about 5 to about 15% by weight.

4. Method as defined in claim 1 wherein the organophosphorus compound is an organophosphate represented by the structural formula:

wherein R is a member selected from the group consisting of alkynyl, alkenyl and aralkenyl radicals.

5. Method as defined in claim 4 wherein the organophosphate is tripropargyl phosphate.

6. Method as defined in claim 1 wherein the organophosphorus compound is an organophosphonate represented by the structural formula:

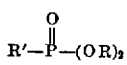

wherein R' is a member selected from the group consisting of alkyl, haloalkyl and alkenyl and R is a member selected from the group consisting of alkynyl, alkenyl and aralkenyl.

7. Method as defined in claim 6 wherein the organophosphonate is dipropargyl 2-chloroethyl phosphonate.

References Cited
UNITED STATES PATENTS

| | | | |
|---|---|---|---|
| 2,662,834 | 12/1953 | Paist et al. | 117—136 X |
| 3,607,745 | 9/1971 | Di Pietro | 252—8.1 |
| 3,062,678 | 11/1968 | McCluer | 117—62 X |
| 3,318,722 | 5/1967 | Ullman | 117—62 |
| 3,163,627 | 12/1964 | Craver | 260—861 |

FOREIGN PATENTS

| | | | |
|---|---|---|---|
| 1,168,662 | 12/1958 | France | 117—136 |
| 1,394,776 | 3/1965 | France | 117—136 |

OTHER REFERENCES

Cherbuliez et al.: Helvetica Chimica Acta, vol. 47, pp. 2098–2105 (1964).

Miles et al.: Textile Research Journal, "A Laboratory Study . . .," pp. 357–362, vol. 39, No. 4, April 1969.

Frick et al.: Textile Research Journal, vol. 25, pp. 100–105, January 1955.

MURRAY KATZ, Primary Examiner

H. J. GWINNELL, Assistant Examiner

U.S. Cl. X.R.

117—143 R; 252—8.1